(12) United States Patent
Akolkar et al.

(10) Patent No.: US 9,128,742 B1
(45) Date of Patent: Sep. 8, 2015

(54) SYSTEMS AND METHODS FOR ENHANCING VIRTUAL MACHINE BACKUP IMAGE DATA

(75) Inventors: Atul Akolkar, Maharashtra (IN); Prasoon Kumar, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 806 days.

(21) Appl. No.: 12/950,972

(22) Filed: Nov. 19, 2010

(51) Int. Cl.
 *G06F 9/455* (2006.01)
(52) U.S. Cl.
 CPC .................................. *G06F 9/45558* (2013.01)
(58) Field of Classification Search
 None
 See application file for complete search history.

(56) References Cited

U.S. PATENT DOCUMENTS

| 2006/0155735 A1* | 7/2006 | Traut et al. ............... 707/101 |
| 2006/0218544 A1* | 9/2006 | Chakraborty et al. ....... 717/168 |
| 2008/0263553 A1* | 10/2008 | Lueck et al. .................. 718/102 |
| 2009/0313447 A1* | 12/2009 | Nguyen et al. .............. 711/162 |
| 2010/0070970 A1* | 3/2010 | Hu et al. ........................ 718/1 |
| 2011/0004735 A1* | 1/2011 | Arroyo et al. ............... 711/162 |
| 2011/0016467 A1* | 1/2011 | Kane ............................... 718/1 |
| 2011/0161952 A1* | 6/2011 | Poddar et al. ................ 717/173 |

OTHER PUBLICATIONS

Tech Guru, VMware Data Recovery: Virtual Machine Backup and Recorvery; http://www.techquark.com/2009/10/vmware-data-recovery-virtual-machine.html; Taken from site on Dec. 9, 2010.
TSM Guru, IBM Tivoli Storage Manager & VMware VCB; http://www.tsmguru.com/vmware/ibm-tivoli-storage-manager-vmware-vcb.html; Taken from site on Dec. 9, 2010.

* cited by examiner

*Primary Examiner* — Gregory A Kessler
(74) *Attorney, Agent, or Firm* — ALG Intellectual Property, LLC

(57) ABSTRACT

A computer-implemented method for enhancing virtual machine backup image data may include identifying a virtual machine to be stored as a backup image. The computer-implemented method may also include collecting configuration information that identifies at least one aspect of how the virtual machine is configured. The computer-implemented method may further include storing the backup image of the virtual machine in a backup repository. The computer-implemented method may additionally include associating the configuration information within the backup image in a catalog of virtual machine backup images, the catalog being searchable by the configuration information. Various other methods, systems, and computer-readable media are also disclosed.

20 Claims, 6 Drawing Sheets

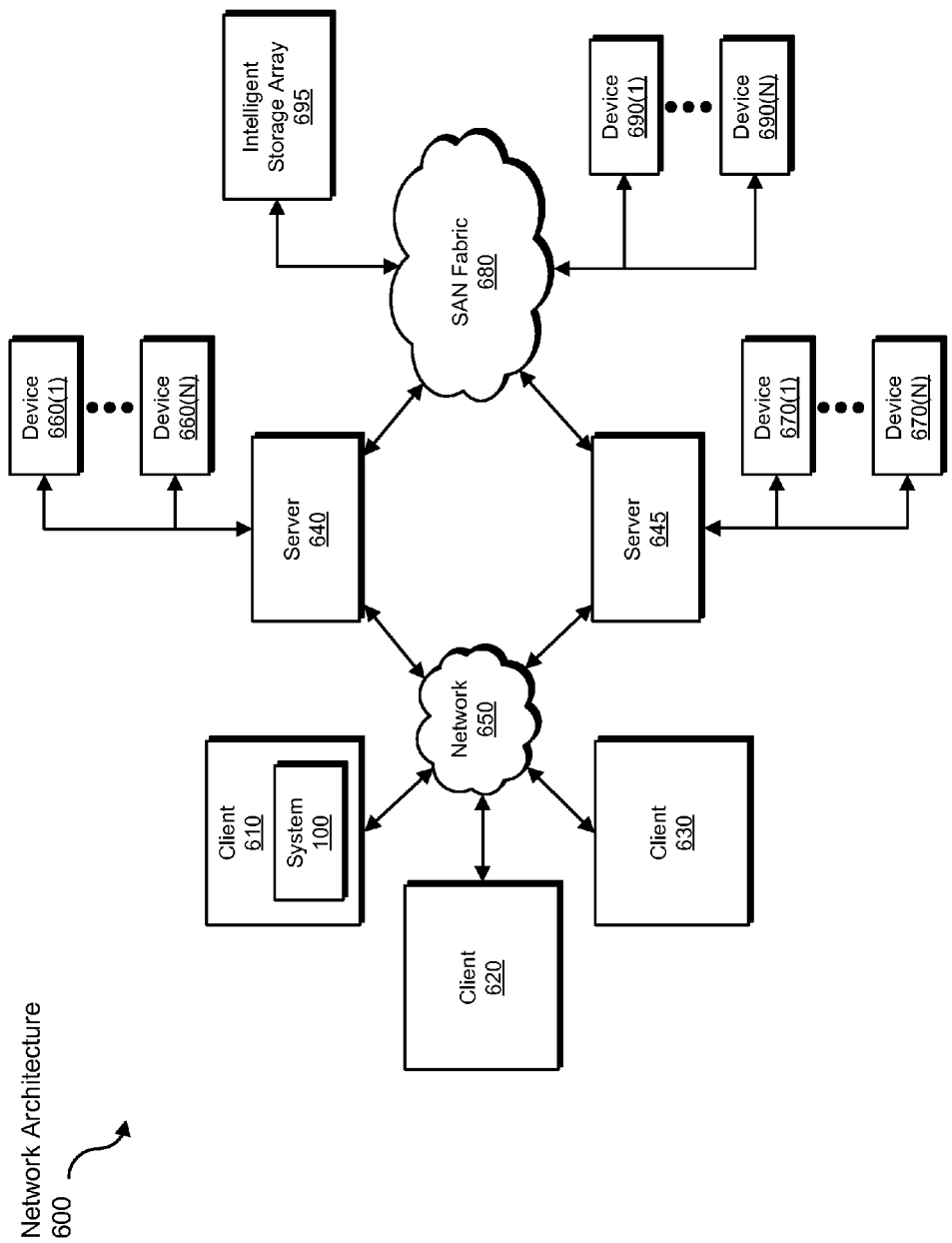

SYSTEMS AND METHODS FOR ENHANCING VIRTUAL MACHINE BACKUP IMAGE DATA

BACKGROUND

Organizations increasingly rely on virtualization technologies to improve the flexibility, efficiency, and stability of their data centers. These organizations may fulfill a variety of computing requirements using virtual machines provisioned with appropriate virtual hardware, operating systems, applications, and configurations.

Unfortunately, managing a large number of virtual machines may require a significant amount of work on the part of an administrator. Creating and configuring new virtual machines, locating and restoring old virtual machines from backup, compiling information on existing virtual machines, and various other tasks may constitute repetitive and tedious work for administrators who could better spend their time on other tasks. Accordingly, the instant disclosure identifies a need for systems and methods for enhancing virtual machine backup image data.

SUMMARY

As will be described in greater detail below, the instant disclosure generally relates to systems and methods for enhancing virtual machine backup image data. Systems and methods described herein may gather information on the configuration of virtual machines during backup (e.g., virtual hardware, installed applications, operational context, etc.) and associate each backed up virtual machine with its configuration information in a searchable catalog. For example, a method may include identifying a virtual machine to be stored as a backup image, collecting configuration information that identifies at least one aspect of how the virtual machine is configured, storing the backup image of the virtual machine in a backup repository, and associating the configuration information with the backup image in a catalog of virtual machine backup images, the catalog being searchable by the configuration information.

The configuration information may include a variety of information. For example, the configuration information may include information identifying virtual hardware of the virtual machine, such a storage device type, a storage device size, a number of storage devices, a type of processor, a number of processors, an amount of random-access memory, a characteristic of a SCSI controller, and/or a characteristic of a network interface controller. Additionally or alternatively, the configuration information may include information identifying an original location of the virtual machine, such as a hypervisor monitoring the virtual machine, a server hosting the virtual machine, a resource pool including the virtual machine, a data center including the virtual machine, and/or a virtual center managing the virtual machine. In additional examples, the configuration information may include information identifying applications installed on the virtual machine and/or information identifying system software installed on the virtual machine.

Systems and methods described herein may also search the catalog described above for a virtual machine using configuration information of the virtual machine as search parameters. For example, a method may include identifying a searchable catalog of virtual machine backup images. The method may also include receiving a search query directed to finding at least one virtual machine in the searchable catalog of virtual machine backup images, the search query identifying configuration information comprising at least one configuration aspect of a sought virtual machine. The method may additionally include querying the searchable catalog with the search query and receiving an identification of a backup image of the virtual machine from the searchable catalog in response to the query.

The configuration information may include a variety of information, including the types of configuration information discussed earlier. For example, the configuration information may include information identifying virtual hardware of the virtual machine, information identifying an original location of the virtual machine, information identifying applications installed on the virtual machine and/or information identifying system software installed on the virtual machine.

The systems described herein may receive the search query in a variety of contexts. For example, these systems may receive a request to instantiate a new virtual machine with a configuration matching the configuration information. In this example, these systems may further instantiate a new virtual machine based on the backup image of the virtual machine. In another example, these systems may receive the search query in the context of receiving a request to generate a report on virtual machines within the searchable catalog that match the configuration information. In this example, these systems may further generate the report.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is a block diagram of an exemplary computing network capable of implementing one or more of the embodiments described and/or illustrated herein.

Figure 1:
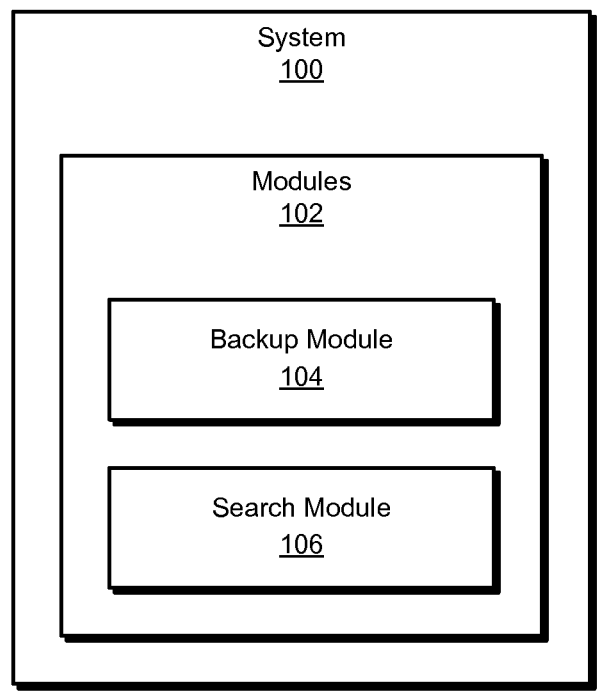
FIG. 1 is a block diagram of an exemplary system for enhancing virtual machine backup image data.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for enhancing virtual machine backup image data. Systems and methods described herein may gather information on the configuration of virtual machines during backup (e.g., virtual hardware, installed applications, operational context, etc.) and associate each backed up virtual machine with its configuration information in a searchable catalog. These systems and methods may also later search the catalog for the virtual machine using at least a portion of the configuration information of the virtual machine as search parameters.

By maintaining a searchable catalog of configuration information for virtual machine backup images, these systems and methods may allow an administrator to more efficiently perform tasks related to the administration of virtual machines, such as creating and configuring new virtual machines, locating and restoring old virtual machines from backup, and compiling information on existing virtual machines.

Figure 2:
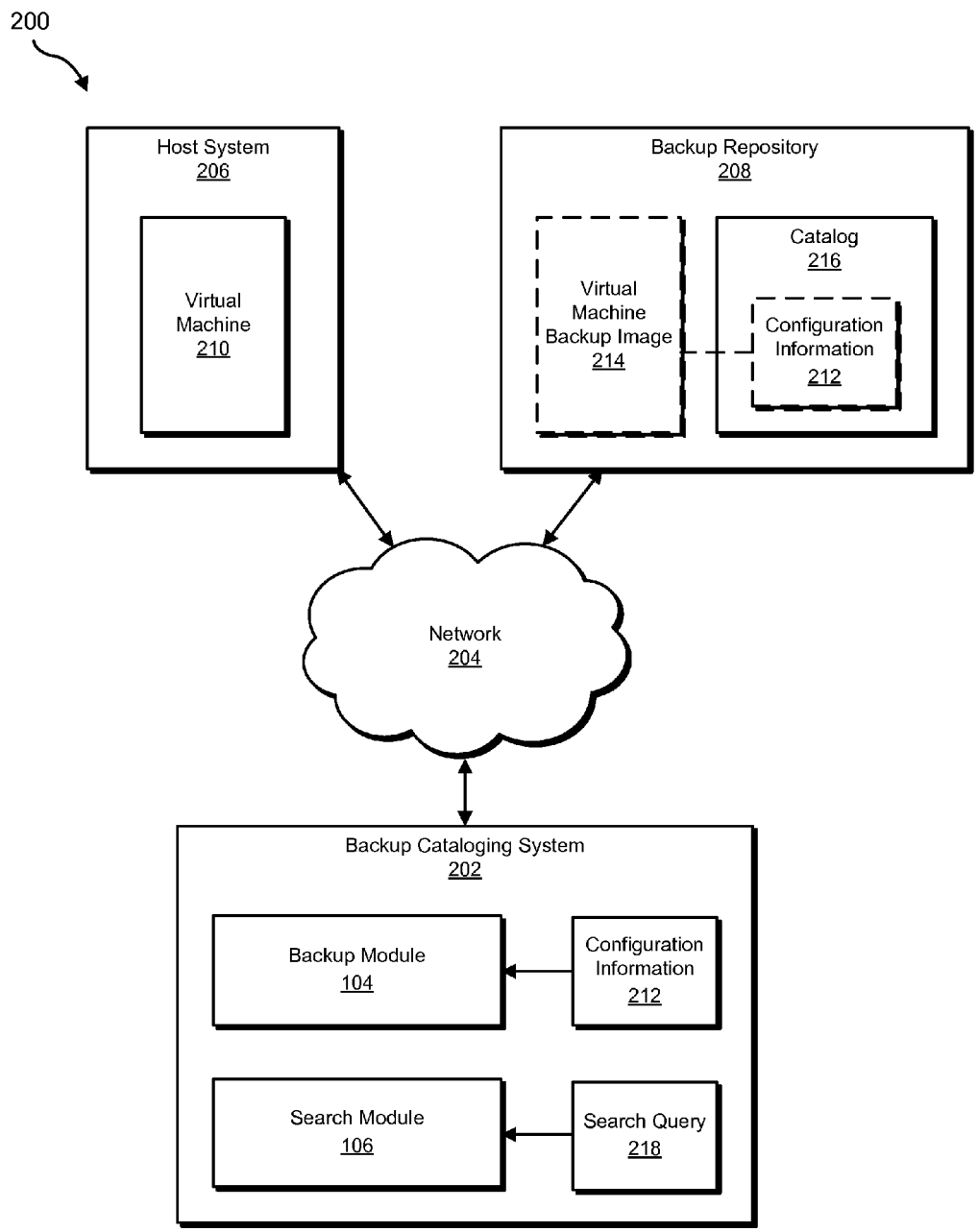
FIG. 2 is a block diagram of another exemplary system for enhancing virtual machine backup image data.

The following will provide, with reference to FIGS. 1-2, detailed descriptions of exemplary systems for enhancing virtual machine backup image data. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for enhancing virtual machine backup image data. As illustrated in this figure, exemplary system 100 may include one or more modules 102 for performing one or more tasks. For example, and as will be explained in greater detail below, exemplary system 100 may include a backup module 104 programmed to identify a virtual machine to be stored as a backup image, collect configuration information that identifies at least one aspect of how the virtual machine is configured, and store the backup image of the virtual machine in a backup repository. Backup module 104 may also be programmed to associate the configuration information with the backup image in a catalog of virtual machine backup images, the catalog being searchable by the configuration information.

In addition, and as will be described in greater detail below, exemplary system 100 may include a search module 106 programmed to identify a searchable catalog of virtual machine backup images. Search module 106 may also be programmed to receive a search query directed to finding at least one virtual machine in the searchable catalog of virtual machine backup images, the search query identifying configuration information comprising at least one configuration aspect of a sought virtual machine. Search module 106 may additionally be programmed to query the searchable catalog with the search query and receive an identification of a backup image of the virtual machine from the searchable catalog in response to the query. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., backup cataloging system 202, host system 206, and/or backup repository 208), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a backup cataloging system 202 in communication with a host system 206 and a backup repository 208 via a network 204. Backup cataloging system 202 may be configured to back up virtual machines from host system 206 to backup repository 208. In one embodiment, and as will be described in greater detail below, backup cataloging system 202 may include backup module 104 and search module 106.

Backup module 104 may be programmed to identify a virtual machine 210 to be stored as a virtual machine backup image 214. Backup module 104 may also collect configuration information 212 that identifies at least one aspect of how virtual machine 210 is configured. Backup module 104 may additionally store virtual machine backup image 214 in backup repository 208. Backup module 104 may also associate configuration information 212 with virtual machine backup image 214 in a catalog 210, catalog 210 being searchable by configuration information 212. While backup module 104 and search module 106 are depicted on backup cataloging system 202, all or portions of modules 102 may be located on host system 206 and/or backup system 208.

Search module 106 may be programmed to receive a search query 218 directed to catalog 216, search query 218 including at least a portion of configuration information 212. Search module 106 may also be programmed to query catalog 216 with search query 218. Search module 106 may additionally be programmed to receive an identification of virtual machine backup image 214 from catalog 216 in response to search query 218. While catalog 216 is depicted in backup repository 208, all or portions of catalog 216 may be located on backup cataloging system 202, host system 206, and/or a separate computing device.

Backup cataloging system 202 generally represents any type or form of computing device capable of reading computer-executable instructions. Examples of backup cataloging system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Host system 206 generally represents any type or form of computing device that is capable of running, hosting, managing, and/or otherwise using a virtual machine. Examples of host system 206 include, without limitation, application servers, hypervisors, virtual centers, and resource pools.

Backup repository 208 generally represents any type or form of computing system that is capable of storing backup data. Backup repository 208 may represent portions of a single storage device or database or a plurality of storage devices or databases. In some examples, backup repository 208 may represent a portion of computing system 510 in FIG. 5 and/or portions of exemplary network architecture 600 in FIG. 6.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between backup cataloging system 202, host system 206, and backup repository 208.

Figure 3:
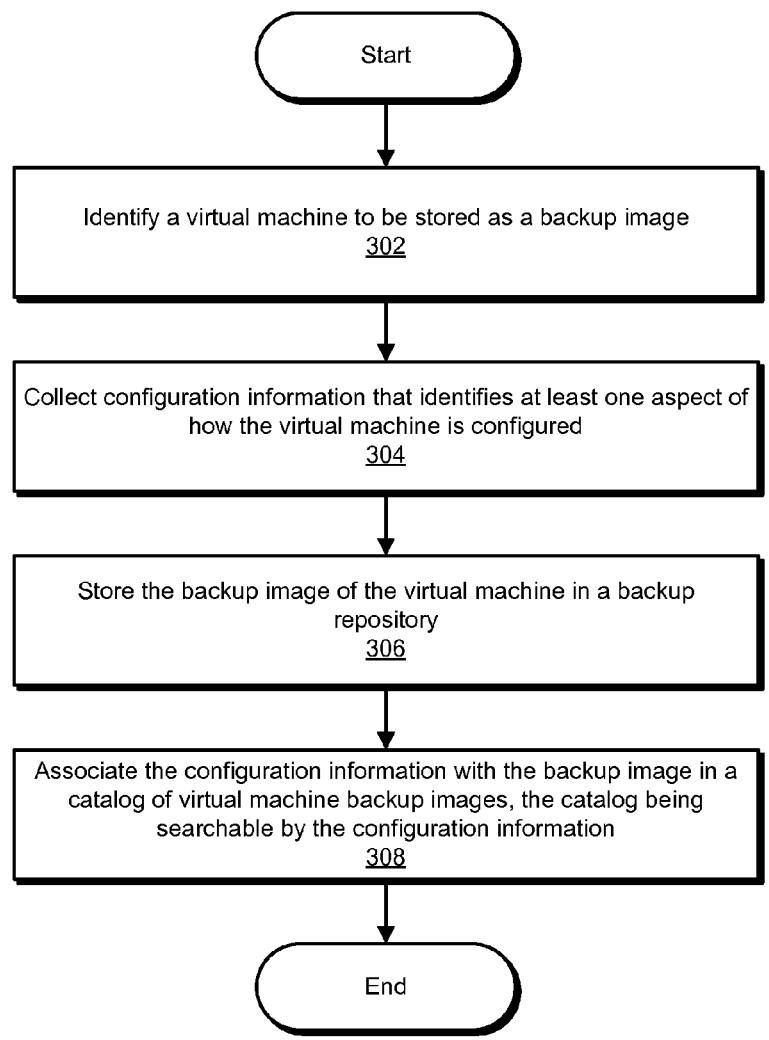
FIG. 3 is a flow diagram of an exemplary method for enhancing virtual machine backup image data.

FIG. 3 is a flow diagram of an exemplary computer-implemented method 300 for enhancing virtual machine backup image data. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a virtual machine to be stored as a backup image. For example, at step 302 backup module 104 may, as part of backup cataloging system 202, identify virtual machine 210.

As used herein, the phrase "virtual machine" generally refers to a computing system platform that may not have direct correspondence to hardware of an underlying host system. For example, hardware of a host system may be abstracted to a virtual machine using a hypervisor or other virtualization software. A virtual machine may run a guest operating system and/or various other software applications. As used herein, the term "image" as applied to a virtual machine may refer a file and/or other data structure that includes data representing the contents and/or structure of the virtual machine, e.g., so as to be able to run the virtual machine and/or reconstruct the virtual machine.

Backup module 104 may identify the virtual machine in any suitable manner. For example, backup module 104 may receive a message from a host system of the virtual machine identifying the virtual machine. Additionally or alternatively, backup module 104 may identify the virtual machine while scanning a host system for virtual machines.

At step 304 one or more of the systems described herein may collect configuration information that identifies at least one aspect of how the virtual machine is configured. For example, at step 304 backup module 104 may, as part of backup cataloging system 202, collect configuration information 212 that identifies at least one aspect of how virtual machine 210 is configured.

The configuration information may include a variety of types of information. In some examples, the configuration information may include information identifying virtual hardware of the virtual machine. For example, the configuration information may include information identifying one or more storage devices of the virtual machine. In this example, the configuration information may identify various aspects of a storage device, such as the type of storage device (e.g., by interface standard, such as IDE/ATA/SATA and/or SCSI; or by storage medium, such as a hard disk drive, an optical disc drive, a solid-state drive a floppy drive, a tape-based storage device, etc.), the size of the storage device (e.g., the total storage capacity of the storage device), the amount of available storage on the storage device (e.g., accounting for software and data already present on the storage device), the number of storage devices, and/or performance specifications of the storage device (e.g., latency, throughput, etc.).

In another example, the configuration information may identify aspects of other virtual hardware such the type of motherboard, the BIOS, the number of processors, the type of processors and/or chipset used (e.g., the specific processor used, the instruction set architecture of the processor, whether the processor is single-core or multi-core, etc.), the amount of random-access memory, the type of random-access memory, characteristics of a SCSI controller (e.g., how many devices the SCSI controller can handle), the number of SCSI controllers, characteristics of a network interface controller (e.g., an identification of an emulated network interface controller and/or a virtual network interface controller, performance specifications of the network interface controller, functionality of the network interface controller, etc.). Additional examples of virtual hardware that the configuration information may identify and/or describe include a graphics card, device ports (e.g., serial ports, parallel ports, USB ports, ethernet ports, etc.), and peripheral input/output devices (e.g., keyboards, mice, printers, etc.). Generally, the configuration information may identify any aspects of any virtual hardware of a virtual machine.

In some examples, the configuration information may include information identifying an original location of the virtual machine. For example, the configuration information may include information identifying a hypervisor monitoring the virtual machine (e.g., at the time of backup). The hypervisor may be identified with any suitable information, such as a unique identification number, a name, a host device, etc. In another example, the configuration information may include identifying a server hosting the virtual machine. The server may be identified with any suitable information, such as a network address, a unique identification number, a name, etc. In an additional example, the configuration information may include information identifying a resource pool including the virtual machine (e.g., a defined group of virtual machines that share underlying physical computing resources). Additionally or alternatively, the configuration information may include information identifying a virtual center managing the virtual machine (e.g., a system managing virtual machines across hypervisors). In some examples, the configuration information may include information identifying a data center managing the virtual machine. The data center may be identified with any suitable information, such as an IP address, a unique identification number, a name, a geographical address, etc. Generally, the configuration information may include any information for categorizing and/or grouping virtual machines by location and/or systems that manage the virtual machines.

In some examples, the configuration information may include information identifying system software installed on the virtual machine. For example, the configuration information may include information identifying an operating system of the virtual machine and/or drivers installed on the virtual machine. Such identifications may also include versioning numbers. Additionally or alternatively, the configuration information may include configuration details of system software installed on the virtual machine (e.g., registry settings, system configuration file settings, etc.). In some examples, the configuration information may include information identifying system utilities installed on the virtual machine, such as security software, system profiling software, system maintenance software, etc.

The configuration information may also include information identifying applications installed on the virtual machine. Such identifications may also include versioning numbers. In addition, the configuration information may include information relating to the configuration of applications installed on the virtual machine, including installed plug-ins, configuration settings, etc.

Backup module 104 may perform step 304 in any suitable manner. In some examples, backup module 104 may harvest at least a portion of the configuration information from a profile of the virtual machine maintained by a host system of the virtual machine (e.g., a hypervisor). For example, if the virtual machine is managed by VMWARE ESX and backed up by SYMANTEC NETBACKUP, backup module 104 may harvest at least a portion of the configuration information from the file at CAProgram Files\VERITAS Wet-Backup\online_utilVi_cntlVVirtualCenter/ESX'.xml. In an additional example, backup module 104 may query a host system of the virtual machine and/or receive a message from the host system including at least a portion of the configuration information. In another example, backup module 104 may analyze and/or parse an image of the virtual machine. In some examples, backup module 104 may collect the configuration information when backing up the virtual machine. Additionally or alternatively, backup module 104 may identify a backed up virtual machine and collect the configuration information.

At step 306 one or more of the systems described herein may store the backup image of the virtual machine in a backup repository. For example, at step 306 backup module 104 may, as part of backup cataloging system 202, store virtual machine backup image 214 in backup repository 208.

Backup module 104 may perform step 306 in any suitable manner. For example, backup module 104 may copy an image of the virtual machine from a host system of the virtual machine to the backup repository. Additionally or alternatively, backup module 104 may direct a data mover and/or a backup appliance to copy and/or replicate an image of the virtual machine to the backup repository.

At step 308 one or more of the systems described herein may associate the configuration information with the backup image in a catalog of virtual machine backup images, the catalog being searchable by the configuration information. For example, at step 308 backup module 104 may, as part of backup cataloging system 202, associate configuration information 212 with virtual machine backup image 214 in catalog 216.

The catalog may include any of a variety of formats and/or data structures. In some examples, the catalog may include a database, such as a relational database. In these examples, backup module 104 may use aspects of the configuration information as attributes in the database to relate to the backup image. Accordingly, a database query based on these attributes may yield the backup image as a result. Additionally or alternatively, portions of the catalog may be stored as metadata files maintained for each virtual machine backup image in the backup repository. In various examples, the catalog may be searchable by a single configuration aspect (e.g., as identified by the configuration information), by an exact configuration match, and/or by compound boolean expressions. In some examples, the catalog may be searchable in that it may be sortable, i.e., closest matches may appear at the top of a sorted list of virtual machines identified in the catalog. After step 308, method 300 may terminate.

Figure 4:
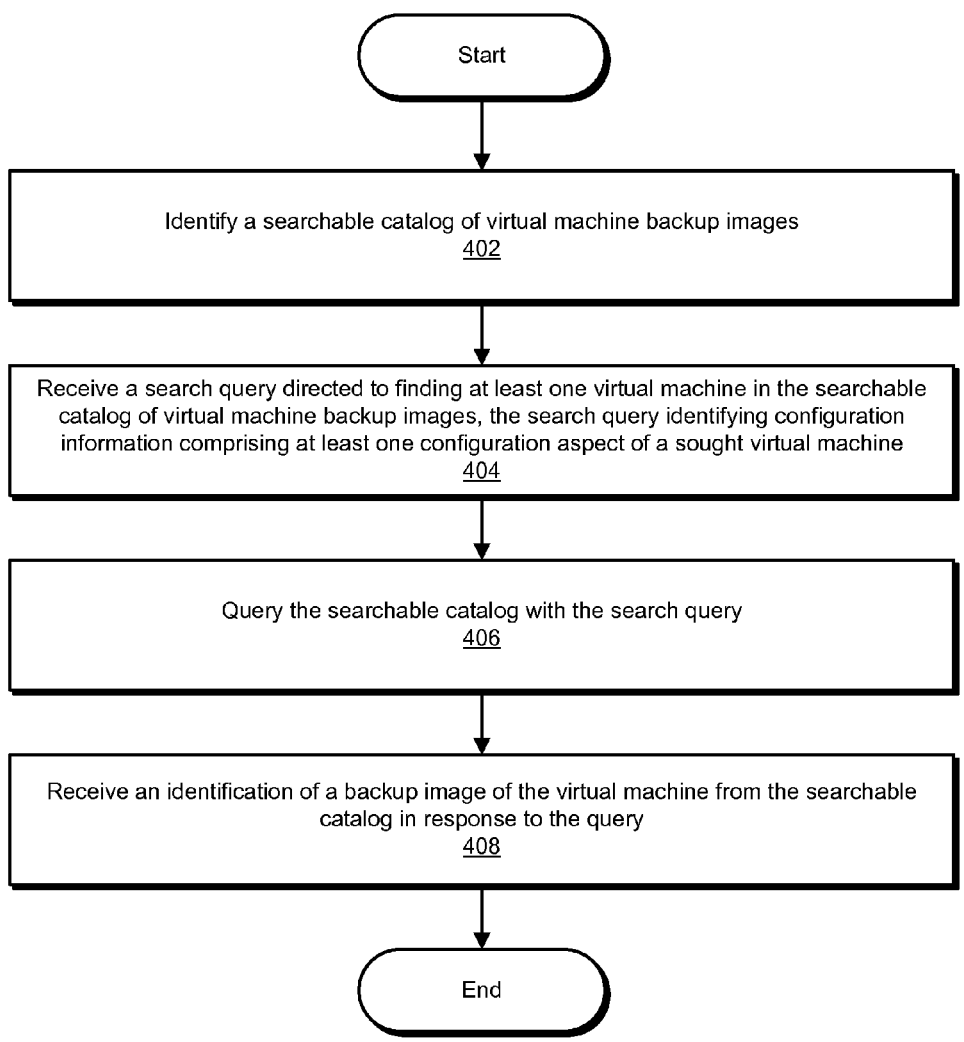
FIG. 4 is a flow diagram of another exemplary method for enhancing virtual machine backup image data.

FIG. 4 is a flow diagram of an exemplary computer-implemented method 400 for enhancing virtual machine backup image data. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2.

As illustrated in FIG. 4, at step 402 one or more of the systems described herein may identify a searchable catalog of virtual machine backup images. For example, at step 402 search module 106 may, as part of backup cataloging system 202, identify catalog 216.

Search module 106 may perform step 402 in any suitable manner. For example, search module 106 may identify a backup repository of virtual machine backup images and locate the catalog within the backup repository. Additionally or alternatively, search module 106 may read a configuration file and/or receive a message that identifies the searchable catalog. The searchable catalog may generally include any characteristics attributed to the catalog described above in relation to step 308.

At step 404 one or more of the systems described herein may receive a search query directed to finding at least one virtual machine in the searchable catalog of virtual machine backup images. The search query may identify configuration information that includes at least one configuration aspect of a sought virtual machine. For example, at step 404 search module 106 may, as part of backup cataloging system 202, identify search query 218.

The configuration information used within the search query may include a variety of information, including any of the types of configuration information described earlier in relation to step 304. For example, the configuration information may include information identifying virtual hardware of the virtual machine, information identifying an original location of the virtual machine, information identifying applications installed on the virtual machine and/or information identifying system software installed on the virtual machine.

Search module 106 may perform step 404 in a variety of contexts. For example, search module 106 may receive the search query as part of a request to instantiate a new virtual machine with a configuration matching the configuration information. As will be described in greater detail below, in this example search module 106 may subsequently instantiate a new virtual machine based on the backup image of the virtual machine. In another example, search module 106 may receive the search query as part of a request to generate a report on virtual machines within the searchable catalog that match the configuration information. As will be described in greater detail below, in this example search module 106 may subsequently generate the report.

At step 406 one or more of the systems described herein may query the searchable catalog with the search query. For example, at step 406 search module 106 may, as part of backup cataloging system 202, query catalog 216 with search query 218.

Search module 106 perform step 406 in any suitable manner. For example, the searchable catalog may include a database and search module 106 may structure the search query as a database query. Additionally or alternatively, the searchable catalog may include an index and/or a metadata file and search module 106 may search the file for portions of the configuration information. In some examples, the searchable catalog may be searchable in that the catalog may be sortable. In these examples, search module 106 may sort virtual machine backup images referenced by the catalog according to a degree to which they match the configuration information. In various examples, search module 106 may query the searchable catalog with a single configuration aspect (e.g., as identified by the configuration information), by an exact configuration match, and/or by compound boolean expressions.

At step 408 one or more of the systems described herein may receive an identification of a backup image of the virtual machine from the search catalog in response to the query. For example, at step 408 search module 106 may, as part of backup cataloging system 202, receive an identification of virtual machine backup image 214 from catalog 216 in response to search query 218.

Search module 106 may receive the identification of the backup image of the virtual machine in a variety of ways. For example, search module 106 may receive a location of the backup image of the virtual machine within a backup repository. In some examples, search module 106 may receive a list of backup images (including the backup image) that match the query. In some additional examples, the list may be sorted by the strength of the match between each backup image and the query. After step 408, method 400 may terminate.

In some examples, the systems described herein may also instantiate a new virtual machine based on the backup image of a virtual machine identified in a search. For example, search module 106 may display the backup image of the virtual machine to an administrator based on the query. The administrator may then select an option to instantiate the displayed virtual machine. These systems may then retrieve the backup image of the virtual machine and use the backup image to create a virtual machine in a target system as selected by the administrator.

By finding, displaying, and allowing a quick instantiation of a virtual machine of a desired configuration, the systems and methods described herein may expedite some virtualization management tasks of an administrator. For example, an administrator may remove a virtual machine that is no longer of use. The administrator may subsequently require a virtual machine with the same configuration, but the administrator may not remember all of the configuration details of the original virtual machine. Using the systems described herein, the administrator may submit a search query with some of the configuration details, find a backup image of the original virtual machine, and then automatically instantiate a virtual machine with the same configuration based on the backup image. For example, the administrator could quickly find and restore a MICROSOFT WINDOWS XP SP2 x86 virtual machine with a MICROSOFT EXCHANGE installation.

In another example, an administrator could remove any currently unused virtual machines from a hypervisor and quickly find and restore them from a backup repository as needed. In some examples, a customer of a virtualization product may request a virtual machine with a certain configuration. In these examples, the backup repository may function as a golden image database for the customer.

The systems described herein may also generate a report on virtual machines within the searchable catalog that match the configuration information. For example, the systems described herein may receive a query for virtual machines managed by a specific virtual center and generate a list of such virtual machines, a count of such virtual machines, and/or statistics of hardware and/or software configurations of such virtual machines. In another example, the systems described herein may receive a query and generate a report for all MICROSOFT WINDOWS 2008 virtual machines with more than 2 gigabytes of RAM. As an additional example, the systems described herein may receive a query and generate a report for all ORACLE SOLARIS multi-computer virtual machines with similar hardware configurations. In this example, the systems described herein may also provide an option to remove duplicate backup images listed in the report.

Figure 5:
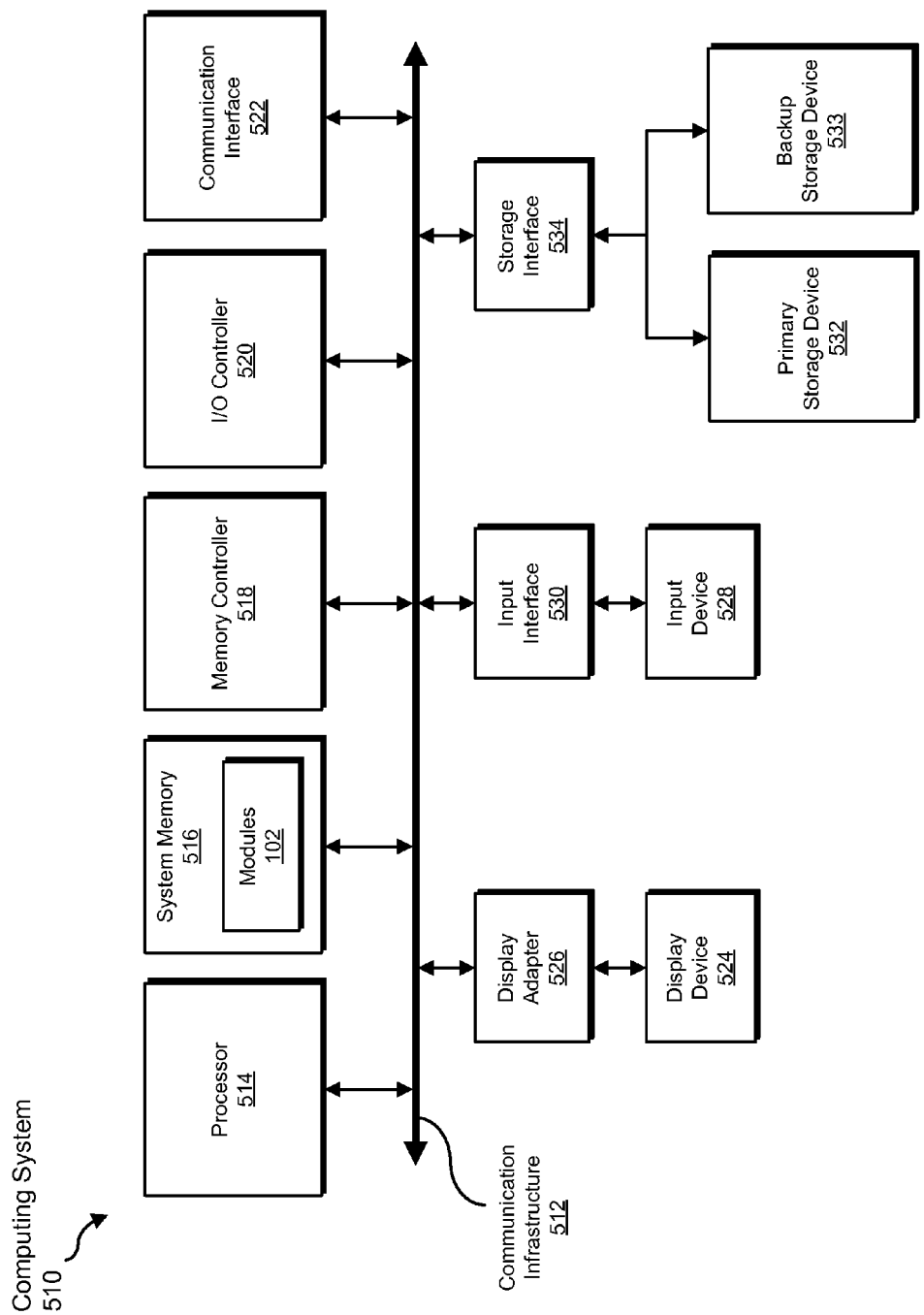
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, collecting, storing, associating, receiving, querying, instantiating, and/or generating steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, collecting, storing, associating, receiving, querying, instantiating, and/or generating.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, collecting, storing, associating, receiving, querying, instantiating, and/or generating steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, collecting, storing, associating, receiving, querying, instantiating, and/or generating steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, collecting, storing, associating, receiving, querying, instantiating, and/or generating steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, collecting, storing, associating, receiving, querying, instantiating, and/or generating steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, collecting, storing, associating, receiving, querying, instantiating, and/or generating steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for enhancing virtual machine backup image data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a backup repository for virtual machine images into a repository searchable by virtual machine configuration details.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enhancing virtual machine backup image data, at least a portion of the method being performed by a computing device comprising at least one processor, the method comprising:
   identifying a virtual machine to be stored as a backup image;
   backing up the virtual machine by storing the backup image of the virtual machine in a backup repository;
   while backing up the virtual machine, collecting configuration information that identifies at least one of:
   virtual hardware of the virtual machine;
   an original location of the virtual machine; or
   system software of the virtual machine,
   the collecting configuration information comprising at least one of:
   harvesting the configuration information from a profile of the virtual machine maintained by a host system of the virtual machine; or
   parsing an image of the virtual machine to identify the configuration information;
   associating the configuration information with the backup image in a catalog of virtual machine backup images, the catalog being searchable by the configuration information;
   maintaining the catalog of the virtual machine backup images such that the virtual machine backup images are accessible via configuration information searches.

2. The computer-implemented method of claim 1, wherein the configuration information comprises information identifying virtual hardware of the virtual machine.

3. The computer-implemented method of claim 2, wherein the information identifying the virtual hardware comprises at least one of:
   a storage device type;
   a storage device size;
   a number of storage devices;
   a type of processor;
   a number of processors;
   an amount of random-access memory;
   a characteristic of a SCSI controller;
   a characteristic of a network interface controller.

4. The computer-implemented method of claim 1, wherein the configuration information comprises information identifying an original location of the virtual machine.

5. The computer-implemented method of claim 4, wherein identifying the original location of the virtual machine comprises identifying at least one of:
   a hypervisor monitoring the virtual machine;
   a server hosting the virtual machine;
   a resource pool including the virtual machine;
   a data center including the virtual machine;
   a virtual center managing the virtual machine.

6. The computer-implemented method of claim 1, wherein collecting the configuration information comprises harvesting the configuration information from the profile of the virtual machine.

7. The computer-implemented method of claim 1, wherein collecting the configuration information comprises parsing the image of the virtual machine to identify the configuration information.

8. A non-transitory computer-readable medium comprising one or more computer-readable instructions that, when executed by at least one processor of a computing device, cause the computing device to:
   identify a virtual machine to be stored as a backup image;
   back up the virtual machine by storing the backup image of the virtual machine in a backup repository;
   while backing up the virtual machine, collect configuration information that identifies at least one of:
   virtual hardware of the virtual machine;
   an original location of the virtual machine; or
   system software of the virtual machine,
   the collecting configuration information comprising at least one of:
   harvesting the configuration information from a profile of the virtual machine maintained by a host system of the virtual machine; or
   parsing an image of the virtual machine to identify the configuration information;
   associate the configuration information with the backup image in a catalog of virtual machine backup images, the catalog being searchable by the configuration information;
   maintain the searchable catalog of the virtual machine backup images such that the virtual machine backup images are accessible via configuration information searches.

9. The non-transitory computer-readable medium of claim 8, wherein the one or more computer-readable instructions, when executed by at least one processor of the computing device, cause the computing device to instantiate a new virtual machine based on the backup image of the virtual machine.

10. The non-transitory computer-readable medium of claim 8, wherein the one or more computer-readable instructions, when executed by at least one processor of the computing device, cause the computing device to receive a search query directed to finding the virtual machine in the searchable catalog, the search query identifying the configuration information.

11. The non-transitory computer-readable medium of claim 10, wherein the one or more computer-readable instructions, when executed by at least one processor of the computing device, cause the computing device to query the searchable catalog with the search query.

12. The non-transitory computer-readable medium of claim 11, wherein the one or more computer-readable instructions, when executed by at least one processor of the computing device, cause the computing device to generate a report on virtual machines within the searchable catalog that match the configuration information identified by the search query.

13. The non-transitory computer-readable medium of claim 8, wherein the configuration information comprises information identifying virtual hardware of the virtual machine.

14. The non-transitory computer-readable medium of claim 13, wherein the information identifying the virtual hardware comprises at least one of:
- a storage device type;
- a storage device size;
- a number of storage devices;
- a type of processor;
- a number of processors;
- an amount of random-access memory;
- a characteristic of a SCSI controller;
- a characteristic of a network interface controller.

15. The non-transitory computer-readable medium of claim 8, wherein the configuration information comprises information identifying an original location of the virtual machine.

16. The non-transitory computer-readable medium of claim 15, wherein the configuration information comprises information identifying at least one of:
- a hypervisor monitoring the virtual machine;
- a server hosting the virtual machine;
- a resource pool including the virtual machine;
- a data center including the virtual machine;
- a virtual center managing the virtual machine.

17. The non-transitory computer-readable medium of claim 8, wherein the configuration information comprises information identifying applications installed on the virtual machine.

18. The non-transitory computer-readable medium of claim 8, wherein the configuration information comprises information identifying system software installed on the virtual machine.

19. A system for enhanced virtual backup image data, the system comprising:
- a backup module programmed to:
    - identify a virtual machine to be stored as a backup image;
    - back up the virtual machine by storing the backup image of the virtual machine in a backup repository;
    - while backing up the virtual machine, collect configuration information that identifies at least one of:
        - virtual hardware of the virtual machine;
        - an original location of the virtual machine; or
        - system software of the virtual machine,
    - the collecting configuration information comprising at least one of:
        - harvesting the configuration information from a profile of the virtual machine maintained by a host system of the virtual machine; or
        - parsing the virtual machine to identify the configuration information;
    - associate the configuration information with the backup image in a catalog of virtual machine backup images, the catalog being searchable by the configuration information;
    - maintain the searchable catalog of the virtual machine backup images such that the virtual machine backup images are accessible via configuration information searches; and
- at least one processor configured to execute the backup module.

20. The system of claim 19, wherein the configuration information comprises information identifying virtual hardware of the virtual machine.

* * * * *